(No Model.)

C. C. ALFRED.
ARCH FOR SUGAR MAKING AND OTHER PURPOSES.

No. 302,699. Patented July 29, 1884.

WITNESSES:
John R. Deemer
C. Sedgwick

INVENTOR:
C. C. Alfred
BY Munn & Co.
ATTORNEYS.

N. PETERS, Photo-Lithographer, Washington, D. C.

UNITED STATES PATENT OFFICE.

CHAUNCEY CHAPIN ALFRED, OF FAIRFAX, VERMONT.

ARCH FOR SUGAR-MAKING AND OTHER PURPOSES.

SPECIFICATION forming part of Letters Patent No. 302,699, dated July 29, 1884.

Application filed April 8, 1884. (No model.)

*To all whom it may concern:*

Be it known that I, CHAUNCEY C. ALFRED, of Fairfax, in the county of Franklin and the State of Vermont, have invented certain new and useful Improvements in Arches for Supporting Evaporating Pans for Sugar-Making and other Purposes, of which the following is a full, clear, and exact description.

This invention, while applicable to other purposes, is more particularly designed to be used as an arch or fire-chamber for pans in the manufacture of sugar; and it consists in a novel construction and shape of the arch, whereby a more even or perfect distribution of the heat under the bottom of the pan is secured, and in providing the fire-box of the arch with a grate arranged within a drawer, whereby the fire may readily be drawn from the arch when the sugar has been sufficiently exposed to the heat, thereby saving the labor and inconvenience of removing the pan from the arch.

Reference is to be had to the accompanying drawings, forming part of this specification, in which similar letters of reference indicate corresponding parts in both the figures.

Figure 1:
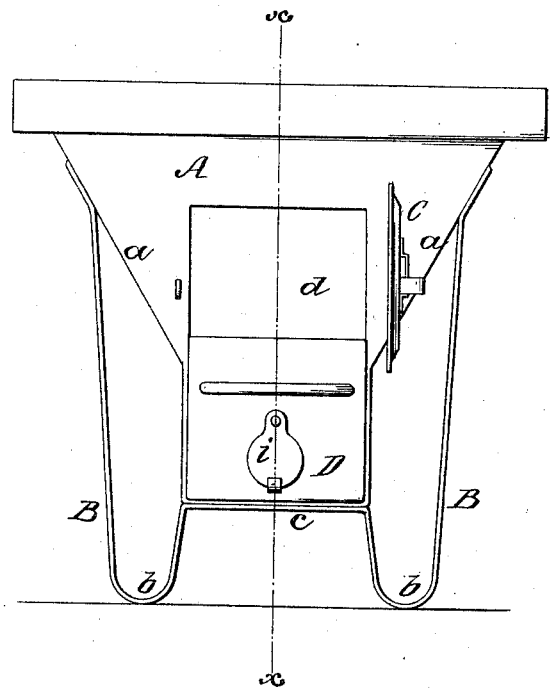
Figure 2:
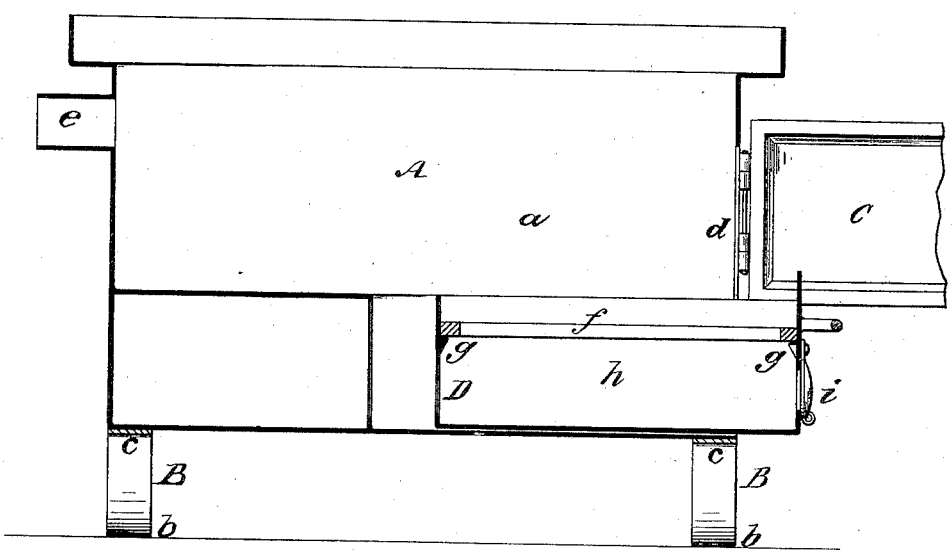

Figure 1 represents a front end view of my improved arch as adapted for use by sugar-makers and others, and Fig. 2 is a vertical longitudinal section of the same on the line $x$ $x$ in Fig. 1.

A is the body of the arch, which is made of sheet-iron, with legs B B, of similar material, extending down from its sides, and bent, as at $b$ $b$ and $c$, to support it, and stiffen and raise its base from the ground. Said body A is of a straight oblong form, with upwardly-flaring sides $a$ $a$, to give an even distribution of the heat over the bottom of the pan, which rests upon or is partially seated within it. At its front end is a feed-opening, $d$, for the fuel, closed, when required, by a door, C, and at its rear end an outlet, $e$, for the escaping gaseous products of combustion. The fire-box is fitted with or formed by a drawer, D, arranged to slide in and out from the base portion of the body A at its forward end, and this drawer is in its turn fitted with a loose grate, $f$, resting on brackets $g$ therein, and leaving an ash space or chamber, $h$, beneath, with a damper, $i$, in its front for regulating the draft. This fire-drawer provides, by sliding it out, for drawing the fire from the arch when the sugar has been sufficiently heated or treated, and so saving the labor and inconvenience of removing the pan containing the sugar.

Having thus fully described my invention, I claim as new, and desire to secure by Letters Patent—

1. An arch or pan-heating chamber for use by sugar-makers and others, having a fuel-feed opening and outlet for the draft, and provided with a fire-drawer fitted with a grate, substantially as and for the purpose specified.

2. The fire-drawer D, provided with a loose grate, $f$, arranged to form or leave beneath it an ash-chamber, $h$, having a damper, $i$, essentially as and for the purposes described.

3. A sheet-metal arch or pan-heating chamber having an upwardly-flaring body, A, and legs B B, and bent at $b$ $b$ and $c$, to support and stiffen the body and raise its base from the ground, extending downward from its sides, substantially as specified.

4. In a sugar-marker's arch or pan-heating chamber, the combination, with the body A, having upwardly-flaring sides, fuel-feed opening $d$, and outlet $e$ for the gaseous products of combustion, of the fire-drawer D, provided with a grate, $f$, arranged to form or leave an ash-chamber, $h$, having a damper, $i$, essentially as and for the purposes specified.

CHAUNCEY CHAPIN ALFRED.

Witnesses:
C. E. MUDGET,
LUTHER B. HUNT.